UNITED STATES PATENT OFFICE.

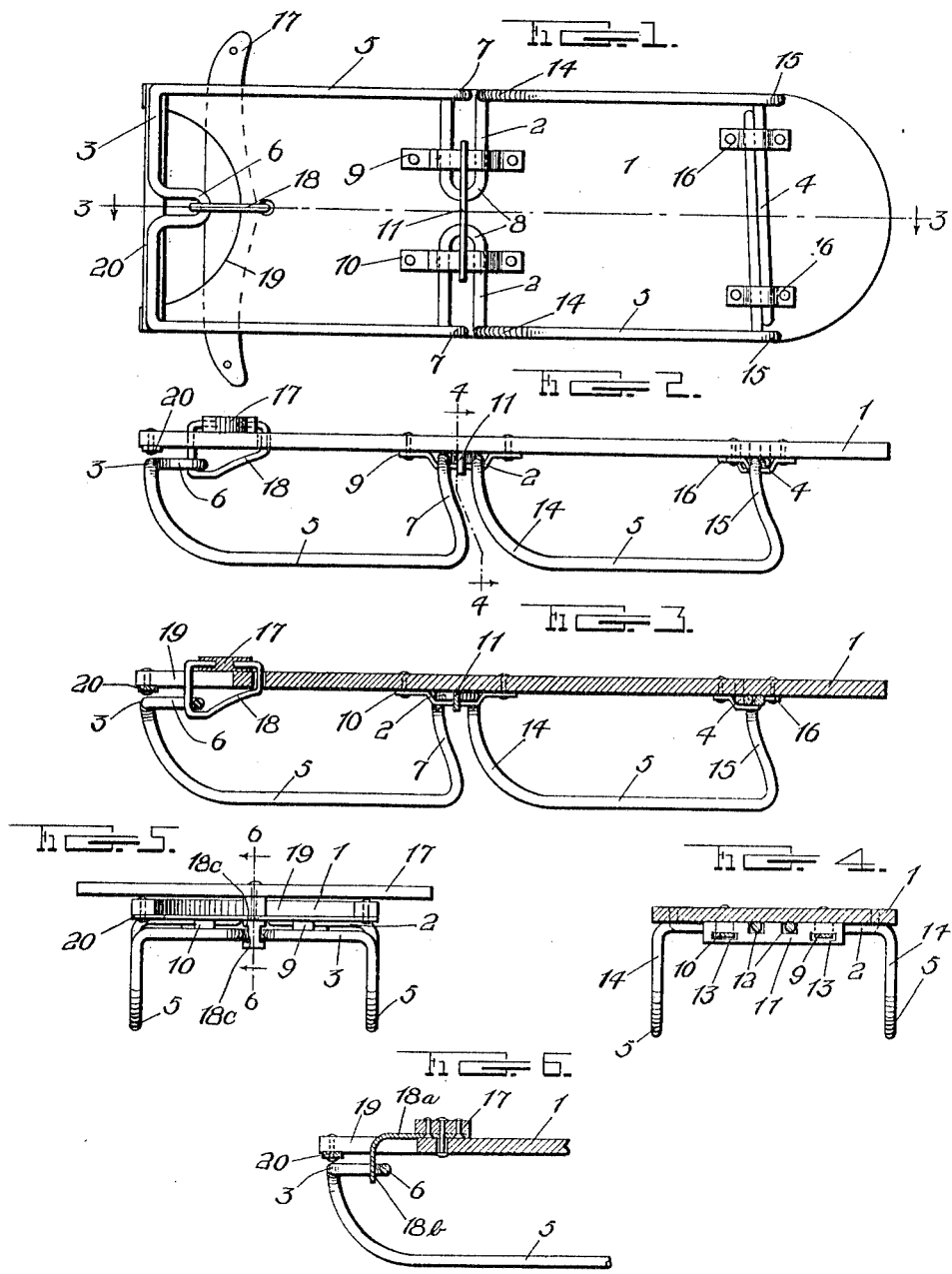

OTTO PEARSON, OF MOUNT JEWETT, PENNSYLVANIA.

SLED.

1,117,434.  Specification of Letters Patent.  Patented Nov. 17, 1914.

Application filed June 11, 1914. Serial No. 844,542.

*To all whom it may concern:*

Be it known that I, OTTO PEARSON, a subject of the King of Sweden, residing at Mount Jewett, in the county of McKean and State of Pennsylvania, have invented certain new and useful Improvements in Sleds; and I do declare the following to be a full, clear, and exact description of the invention, such as will enable others skilled in the art to which it appertains to make and use the same.

This invention relates to sleds and more especially to hand or coasting sleds.

The object of the invention is to provide a strong, economically manufactured sled in which the benches, runners and cross bars are made in one piece and the construction of which renders it unnecessary to employ spring steel therefor.

Another object is to provide improved means for attaching the steering bar to the front cross bar of this combined runner, bench and cross bar.

With these and other objects in view the invention consists of certain novel features of construction, and the combination and arrangement of parts as will be hereinafter described and claimed.

In the accompanying drawings: Figure 1 represents a bottom plan view of one form of sled constructed in accordance with this invention: Fig. 2 is a side elevation thereof: Fig. 3 is a longitudinal vertical section taken on the line 3—3 of Fig. 1: Fig. 4 is a transverse vertical section taken on the line 4—4 of Fig. 2: Fig. 5 is a front elevation showing another form of steering bar connecting means: Fig. 6 is a detail longitudinal sectional view of the front portion of the sled taken on line 6—6 of Fig. 5.

In the embodiment illustrated in Figs. 1 to 4 an ordinary seat or platform 1 is here shown composed of a single piece supported on a central cross bar 2 and front and rear cross bars 3 and 4 all of which are formed integral with the runners 5 as will now be described. These cross bars, the runners and the benches are all formed from a single piece of metal of any suitable or desired shape in cross section being here shown constructed of a heavy metal rod bent intermediately of its ends to form the front cross bar 3 which is here shown with a laterally extending loop 6 of substantially U- or staple shape and which may extend in any desired direction being here shown extended rearwardly. This rod is then bent laterally from the opposite ends of this cross bar and curved to form the front ends of the runners and the two members thereof are extended in parallel planes for a predetermined distance and which are then bent inwardly for the same distance to form benches 7. From the inner ends of these benches 7 extend loops 8 arranged at right angles to the benches and extending inwardly to form the intermediate cross bar 2. These loops 8 are secured to the bottom of the sled platform in any suitable manner the means here shown being in the form of two metal straps 9 and 10 which extend transversely across the loops and are secured at their opposite ends to the sled platform. A bar 11 has one edge recessed as shown at 12 to receive the ends of the loops 8 and the ends of this bar are slotted as shown at 13 and through which slots said straps 9 and 10 pass. These straps 9 and 10 hold the bar against longitudinal movement and the bar in its turn by means of the notches or recesses therein engage the loops 8 and hold them against lateral movement whereby the runners are rigidly secured at this point to the sled platform. After these loops 8 have been formed the rod is extended at right angles from the inner ends of the loops to form benches 14 which are the same height or length as the benches 7 of the front portion of the runner. The two members of the rod are then extended longitudinally in alinement with the front portions of the runner and are then bent laterally inward at right angles to form the rear benches 15. The ends of the rod extend inwardly toward each other from the inner ends of these benches 15 and preferably have their terminals bent inwardly or upwardly at right angles to engage apertures in the sled seat at the rear end thereof. These rod ends overlap each other and are arranged in parallel relation to form the rear cross bar 4 and are held in operative position by means of metal straps 16 which span said cross bar and are connected by suitable fastening elements to the sled seat.

From the above description it will be obvious that the runner cross bars and benches are made from a single piece of metal which provides a very cheap construction and one of great strength.

The staple-like or U-shaped loop 6 in the front cross bar is designed for connecting the steering bar 17 with the front cross bar which is here shown connected by means of a metal link 18 which extends through said loop 6 and edgewise through the steering bar and transversely through the sled seat, the ends of said link being housed within the steering bar. The front portion of the sled seat as shown has a recess 19 formed therein and the ends of this recess are connected by a cross bar 20 the link 18 passing through the sled seat midway the width thereof and at a point in alinement with the center of said recess. The movement of the steering bar to either side will be limited by the engagement of said link 18 with one or the other side of said recess but sufficient movement is permitted to provide for the proper steering of the sled.

By forming the central cross bar 2 of the loops 8 a spring like structure is provided the movement of the steering bar to either side causing the adjacent side of the loop 8 disposed on that side of the sled to yield and move laterally thereby avoiding the necessity of bending of the runners proper which permits said runner to be made of ordinary iron and not of spring steel as has heretofore been found necessary. Upon the release of the steering bar the loop of the cross bar will spring inwardly and force the runner back into normal position.

In Figs. 5 and 6 another form of the steering bar connecting means is shown in which a tongue 18ᵃ is secured at one end to the sled seat and extends forward a predetermined distance with its free end bent downwardly in a plane at right angles for engagement with the loop 6. This downbent end 18ᵇ is provided with laterally extending lugs 18ᶜ which are designed to engage the upper and lower faces of the loop 6.

I claim as my invention:

1. A single piece of metal bent to form front and rear runner portions with a cross bar arranged intermediately between them and composed of laterally extending loops and with front and rear cross bars at their ends.

2. A single piece of metal bent to form front and rear runner portions with a cross bar arranged intermediately between them and composed of loops extending laterally inward toward each other and adapted to be arranged transversely of the sled and with front and rear cross bars at their ends.

3. A single piece of metal bent to form front and rear runner portions with a cross bar arranged intermediately between them and composed of loops extending laterally inward toward each other and adapted to be arranged transversely of the sled and with front and rear cross bars at their ends, a bar having recesses to engage the inner ends of said loops and provided beyond said recesses with longitudinally extending slots, and straps passing through said slots and spanning said loops and adapted to be secured to the sled body.

4. An article of the class described comprising a single piece of metal bent intermediately of its ends to form a cross bar, said metal being then bent laterally from the opposite ends of said cross bar and curved to form the front ends of the sled runners, the two members of which are extended in parallel planes for a predetermined distance and then bent upwardly to form benches, said benches having extensions at their upper ends in the form of loops which merge into downwardly extending bench members, said rod then being extended longitudinally in alinement with the front runner portions and then bent upwardly to form rear bench members and then laterally inward to form a rear cross bar.

5. An article of the class described comprising a single piece of metal bent intermediately of its ends to form a cross bar, said metal being then bent laterally from the opposite ends of said cross bar and curved to form the front ends of the sled runners, the two members of which are extended in parallel planes for a predetermined distance and then bent upwardly to form benches, said benches having extensions at their upper ends in the form of loops which merge into downwardly extending bench members, said rod then being extended longitudinally in alinement with the front runner portions and then bent upwardly to form rear bench members and then laterally inward to form a rear cross bar, the front cross bar of said article having a laterally extending loop.

6. An article of the class described comprising a single piece of metal bent intermediately of its ends to form a cross bar, said metal being then bent laterally from the opposite ends of said cross bar and curved to form the front ends of the sled runners, the two members of which are extended in parallel planes for a predetermined distance and then bent upwardly to form benches, said benches having extensions at their upper ends in the form of loops which merge into downwardly extending bench members, said rod then being extended longitudinally in alinement with the front runner portions and then bent upwardly to form bench members and then laterally inward to form a rear cross bar, said front cross bar having a laterally extending U-shaped loop therein.

In testimony whereof I have hereunto set my hand in presence of two subscribing witnesses.

OTTO PEARSON.

Witnesses:
SEXTUS LUNDBERG,
HAROLD K. LUNDBERG.